(No Model.)
C. LAVAL.
APPARATUS FOR SILVERING GLASS IN THE MANUFACTURE OF MIRRORS.
No. 375,640. Patented Dec. 27, 1887.
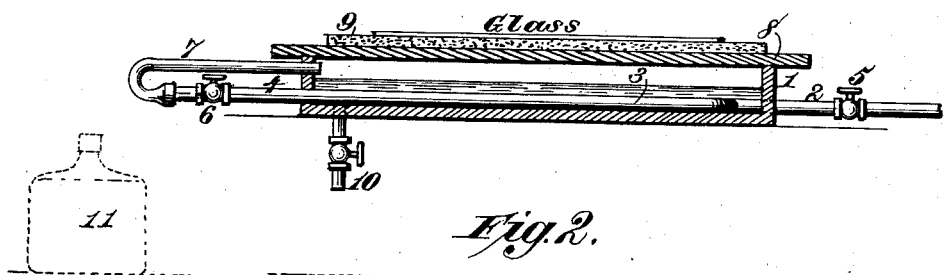
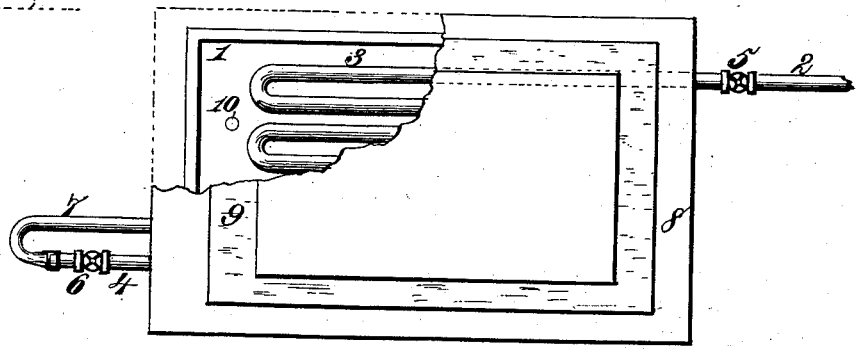
Witnesses,
Robert Everett
J. A. Rutherford
Inventor.
Constant Laval,
By
James L. Norris.
Atty.

UNITED STATES PATENT OFFICE.

CONSTANT LAVAL, OF KANSAS CITY, MISSOURI.

APPARATUS FOR SILVERING GLASS IN THE MANUFACTURE OF MIRRORS.

SPECIFICATION forming part of Letters Patent No. 375,640, dated December 27, 1887.

Application filed August 4, 1887. Serial No. 246,134. (No model.)

*To all whom it may concern:*

Be it known that I, CONSTANT LAVAL, a citizen of the United States, residing at Kansas City, in the county of Jackson and State of Missouri, have invented new and useful Improvements in Apparatus for Silvering Glass in the Manufacture of Mirrors, of which the following is a specification.

This invention has for its object to provide a novel apparatus for heating the lower surface of the glass during the silvering process in the manufacture of mirrors; to provide novel means for obtaining the distilled water, necessary in the process of making mirrors, without employing a separate still, as is ordinarily practiced, and to provide novel means for preventing breakage of the glass plate during the heating process and for precipitating or drawing the silver deposit down upon the glass plate. These objects I accomplish in the manner and by the combination of devices hereinafter described and claimed, reference being made to the accompanying drawings, in which—

Figure 1 is a longitudinal sectional view of an apparatus embodying my invention, and Fig. 2 a broken plan view of the same.

In order to enable those skilled in the art to make and use my invention, I will now describe the same in detail, referring to the drawings, where—

The numeral 1 indicates a pan or tank of any dimensions suitable for the conditions required—say one hundred and fifty inches in length by seventy-six inches in width—and made of galvanized iron, or any other material that will serve the purpose. A steam-pipe, as at 2, enters a corner at one end of the pan or tank, and in the latter is extended into numerous lengths of pipe in the form of a coil, 3, the other end of the steam-pipe extending through a corner of the pan or tank at its opposite end, as at 4. The pipe 2 is to connect with any steam-supply, and it is provided with a valve, 5, to govern the entrance of steam into the coil, while the outlet 4 of the pipe is provided with a valve, 6, to control the passage of steam from the coil. The outlet 4 is provided with a flexible pipe or hose, which is passed into the top or side of the tank to deliver the steam thereinto, and when the water in the tank is sufficiently heated the hose 7 is withdrawn from the tank and inserted in a carboy or similar receptacle, 11, as in dotted lines, to be filled with the condensed steam that comes from the flexible hose 7, which is attached to the outlet of the coil 4, thus producing distilled water in any quantity desired. The top of the pan or tank is closed by a plate, 8, of metal, slate, marble, or other substance which is a good conductor of heat, and the whole is properly leveled until the surface of said plate is in a true horizontal plane.

The surface of the plate is provided with a blanket, 9, (one or more,) composed of suitable absorbent material—such as felt—which blanket (one or more) is supplied with water to keep it constantly moistened, so as to prevent breakage of the glass plate to be silvered, which will occur where the plate is subjected to dry heat in the silvering process.

The silvering solution is prepared in any suitable manner—as, for example, as set forth in my application for Letters Patent filed April 25, 1887, Serial No. 236,071. The glass plate to be silvered is carefully cleaned and polished with rouge-powder and felt, or tin-powder, and is then cleansed and rinsed with distilled water, after which the glass is placed upon the moistened blanket or blankets 9. The silvering solution is then poured carefully upon the surface of the glass, the perfectly-level position of the latter permitting it to retain a considerable quantity. The steam-valve 5 is then opened and live steam admitted directly into the pan or tank upon the water therein through the coil and hose, as above explained. The increased temperature thus produced acts upon the lower surface of the glass through the plate 8 and moist blanket 9, causing a precipitation of the metal, or, in other words, drawing the silver deposit down upon the glass, to which it firmly adheres.

The heat can be regulated under the glass, so that a uniform coating is produced, and owing to this regulation of the heat I obtain a better deposition of the silver than is possible where the glass is treated in a chamber where it is exposed to heat upon both sides.

The silvered glass treated as before set forth is then finished in any suitable manner, preferably as explained in my application before mentioned.

Whenever it is necessary to empty the tank for cleaning or other purposes, the water can be draw off at the bottom outlet, 10.

Having thus described my invention, what I claim is—

1. An apparatus for precipitating the silver solution upon glass in the manufacture of mirrors, consisting of a closed pan or tank having a level top plate, a valved steam-pipe entering the pan extended into a coil therein, and projecting outside the pan in a valved extension, and a pipe communicating with the latter and extending into the pan to deliver live steam thereinto, substantially as described.

2. An apparatus for precipitating the silver solution on glass in the manufacture of mirrors, comprising a closed pan or tank having a level top plate, an absorbent-blanket on the surface of the plate to receive the glass, a valved steam-pipe entering the pan, extended into a coil therein and projecting outside the pan in a valved extension, and a pipe or hose connected with the latter and in communication with the interior of the pan, substantially as described.

In testimony whereof I affix my signature in presence of two witnesses.

CONSTANT LAVAL.

Witnesses:
A. BARTHELS,
ROBT. MILLER.